US011956652B2

United States Patent
Abedini et al.

(10) Patent No.: US 11,956,652 B2
(45) Date of Patent: Apr. 9, 2024

(54) SYNCHRONIZATION SIGNAL BLOCK-BASED INTERFERENCE MEASUREMENT

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Luca Blessent, Whitehouse Station, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/117,721

(22) Filed: Dec. 10, 2020

(65) Prior Publication Data

US 2021/0185550 A1    Jun. 17, 2021

Related U.S. Application Data

(60) Provisional application No. 62/947,892, filed on Dec. 13, 2019.

(51) Int. Cl.
*H04W 24/08* (2009.01)
*H04W 24/10* (2009.01)
*H04W 72/541* (2023.01)

(52) U.S. Cl.
CPC ........... *H04W 24/08* (2013.01); *H04W 24/10* (2013.01); *H04W 72/541* (2023.01)

(58) Field of Classification Search
CPC ... H04W 24/08; H04W 24/10; H04W 72/082; H04W 48/16; H04W 84/047; H04W 88/085; H04W 56/0015; H04L 5/0073; H04L 5/0051; H04L 5/0048; H04B 17/345
See application file for complete search history.

(56) References Cited

U.S. PATENT DOCUMENTS

| 2019/0068443 A1* | 2/2019 | Li ..................... H04L 41/0823 |
| 2019/0103928 A1 | 4/2019 | Nagaraja et al. |
| 2019/0124533 A1* | 4/2019 | Tenny .................. H04L 5/0048 |

(Continued)

FOREIGN PATENT DOCUMENTS

| WO | WO-2018236256 A1 | 12/2018 |
| WO | WO-2019196906 | 10/2019 |

OTHER PUBLICATIONS

International Search Report and Written Opinion—PCT/US2020/064549—ISA/EPO—dated Mar. 23, 2021.

(Continued)

*Primary Examiner* — Chi H Pham
*Assistant Examiner* — Raul Rivas
(74) *Attorney, Agent, or Firm* — Holland & Hart LLP

(57) ABSTRACT

Aspects of the present disclosure provide techniques for interference measurements based on synchronization signal blocks (SSB) in a network (e.g., an Integrated Access and Backhaul (IAB) network. In some cases, a node determines resources used for periodic SSB transmissions by at least one parent node of the network, uses the determined resources to perform SSB-based interference measurements, and communicates with at least one of the parent node, a central unit (CU), or another node of the network based on the SSB-based interference measurements.

24 Claims, 12 Drawing Sheets

(56) References Cited

U.S. PATENT DOCUMENTS

2019/0363810 A1 11/2019 Luo et al.
2019/0373627 A1 12/2019 Luo et al.
2022/0078865 A1* 3/2022 Novlan ................. H04W 76/15

OTHER PUBLICATIONS

Lenovo, et al., "Discussion of Multi-Beam Operation", 3GPP TSG RAN WG1 Ad-Hoc Meeting 1901, 3GPP Draft, R1-1900387, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 24, 2019, Jan. 20, 2019 (Jan. 20, 2019), XP051593301, 6 Pages, Retrieved from the Internet: URL: http://www.3gpp.org/ftp/Meetings%5F3GPP%5FSYNC/RAN1/Docs/R1%2D1900387%2Ezip [retrieved on Jan. 20, 2019], Section 4, table 1.

NTT Docomo, et al., "Extensions of SSBs for Inter-IAB-Node Discovery and Measurements", 3GPP TSG RAN WG1 Ad-Hoc Meeting 1901, 3GPP Draft, R1-1900958_Extensions of SSBs for Inter-IAB-Node Discovery and Measurements_Final, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), 5 Pages, XP051593803, Retrieved from the Internet: URL: http://www.3gpp.org/ftp/Meetings%5F3GPP%5FSYNC/RAN1/Docs/R1%2D1900958%2Ezip [retrieved on Jan. 20, 2019], Sections 1 and 2.

* cited by examiner

SYNCHRONIZATION SIGNAL BLOCK-BASED INTERFERENCE MEASUREMENT

CROSS-REFERENCE TO RELATED APPLICATION(S)

This application claims benefit of and priority to U.S. Provisional Application No. 62/947,892, filed Dec. 13, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for interference measurements based on synchronization signal blocks (SSB), for example, in an Integrated Access and Backhaul (IAB) network or other type of network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a child node (e.g., a UE or MU of an integrated access and backhaul (IAB) network) of a network. The method generally includes determining synchronization signal block (SSB) resources used for periodic SSB transmissions by at least one parent node of the network. The method generally includes using the determined resources to perform SSB-based interference measurements. The method generally includes communicating with at least one of the parent node, a central unit (CU), or another node of the network based on the SSB-based interference measurements.

Certain aspects provide a method for wireless communications by a parent node (e.g., a parent node/DU or CU of an IAB network) of a network. The method generally includes determining resources used for periodic SSB transmissions by at least one child node of the network. The method generally includes using the determined resources to perform SSB-based interference measurements. The method generally includes communicating with at least one of the child node, a CU, or another node of the network based on the SSB-based interference measurements.

Certain aspects provide a method for wireless communications by a central unit (e.g., a CU of an IAB network) of a network. The method generally includes providing a first node of the network with an indication of SSB resources used for periodic SSB transmissions by at least one second node of the network.

Certain aspects provide an apparatus for wireless communications. The apparatus generally includes at least one processor, and a memory coupled to the at least one processor. The memory generally includes code executable by the at least one processor to cause the apparatus to determine SSB resources used for periodic SSB transmissions by at least one parent node of the network. The memory generally includes code executable by the at least one processor to cause the apparatus to use the determined resources to perform SSB-based interference measurements. The memory generally includes code executable by the at least one processor to cause the apparatus to communicate with at least one of the parent node, a CU, or another node of the network based on the SSB-based interference measurements.

Certain aspects provide an apparatus for wireless communications. The apparatus generally includes at least one processor, and a memory coupled to the at least one processor. The memory generally includes code executable by the at least one processor to cause the apparatus to determine resources used for periodic SSB transmissions by at least one child node of the network. The memory generally includes code executable by the at least one processor to cause the apparatus to use the determined resources to perform SSB-based interference measurements. The method generally includes communicating with at least one of the child node, a CU, or another node of the network based on the SSB-based interference measurements.

Certain aspects provide an apparatus for wireless communications. The apparatus generally includes at least one processor, and a memory coupled to the at least one processor. The memory generally includes code executable by the at least one processor to cause the apparatus to provide a first node of the network with an indication of SSB resources used for periodic SSB transmissions by at least one second node of the network.

Certain aspects provide an apparatus for wireless communications. The apparatus generally includes means for determining SSB resources used for periodic SSB transmissions by at least one parent node of the network. The apparatus generally includes means for using the determined resources to perform SSB-based interference measurements. The apparatus generally includes means for communicating with at least one of the parent node, a CU, or another node of the network based on the SSB-based interference measurements.

Certain aspects provide an apparatus for wireless communications. The apparatus generally includes means for determining resources used for periodic SSB transmissions by at least one child node of the network. The apparatus generally includes means for using the determined resources to perform SSB-based interference measurements. The apparatus generally includes means for communicating with at least one of the child node, a CU, or another node of the network based on the SSB-based interference measurements.

Certain aspects provide an apparatus for wireless communications. The apparatus generally includes means for providing a first node of the network with an indication of SSB resources used for periodic SSB transmissions by at least one second node of the network.

Certain aspects provide a computer-readable medium storing computer executable code thereon for wireless communication. The computer-readable medium generally includes code for determining SSB resources used for periodic SSB transmissions by at least one parent node of the network. The computer-readable medium generally includes code for using the determined resources to perform SSB-based interference measurements. The computer-readable medium generally includes code for communicating with at least one of the parent node, a CU, or another node of the network based on the SSB-based interference measurements.

Certain aspects provide a computer-readable medium storing computer executable code thereon for wireless communication. The computer-readable medium generally includes code for determining resources used for periodic SSB transmissions by at least one child node of the network. The computer-readable medium generally includes code for using the determined resources to perform SSB-based interference measurements. The computer-readable medium generally includes code for communicating with at least one of the child node, a CU, or another node of the network based on the SSB-based interference measurements.

Certain aspects provide a computer-readable medium storing computer executable code thereon for wireless communication. The computer-readable medium generally includes code for providing a first node of the network with an indication of SSB resources used for periodic SSB transmissions by at least one second node of the network.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
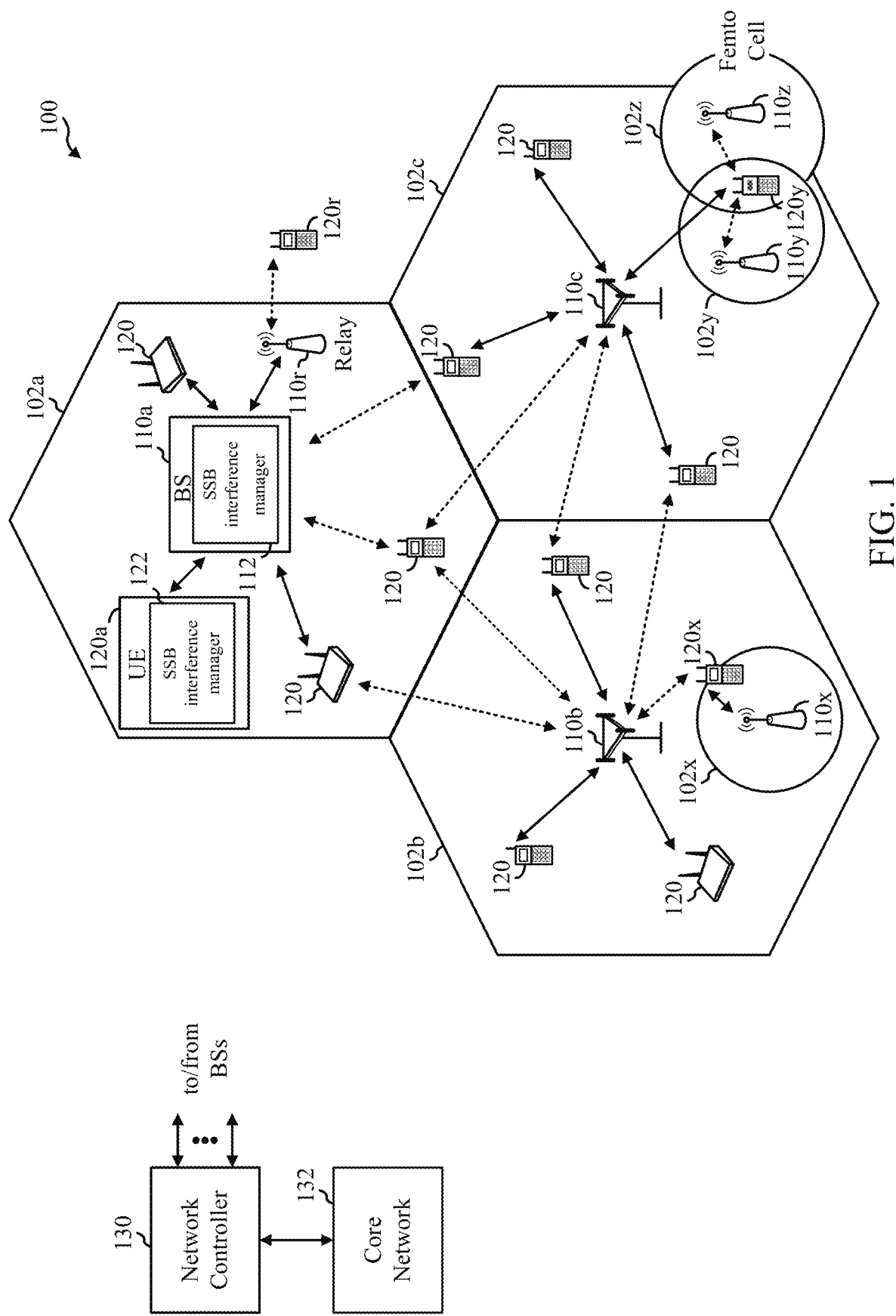
FIG. 1 is a block diagram conceptually illustrating an example wireless communication network, in accordance with certain aspects of the present disclosure.

Aspects of the present disclosure provide techniques for interference measurements based on synchronization signal blocks (SSBs) in a wireless network, such as an Integrated Access and Backhaul (IAB) network. In some cases, a first node determines SSB resources used for periodic SSB transmissions by at least one second node, uses the determined resources to perform SSB-based interference measurements, and communicates with at least one of the parent node, a central unit (CU), or another node of the network based on the SSB-based interference measurements.

The following description provides examples of SSB-based interference measurements in IAB networks in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed.

For example, wireless communication network 100 may include base stations (BSs) 110 and UEs 120 configured for interference measurements based on SSBs in an IAB network. As shown in FIG. 1, the BS 110a includes a SSB measurement manager 112 that communicates with nodes of the IAB network based on SSB-based interference measurements, in accordance with aspects of the present disclosure. The UE 120a includes a SSB measurement manager 122 that communicates with nodes of the IAB network based on SSB-based interference measurements, in accordance with aspects of the present disclosure.

The wireless communication network 100 may be an NR system (e.g., a 5G NR network). As shown in FIG. 1, the wireless communication network 100 may be in communication with a core network 132. The core network 132 may in communication with one or more BSs 110a-z (each also individually referred to herein as BS 110 or collectively as BSs 110) and/or UE 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
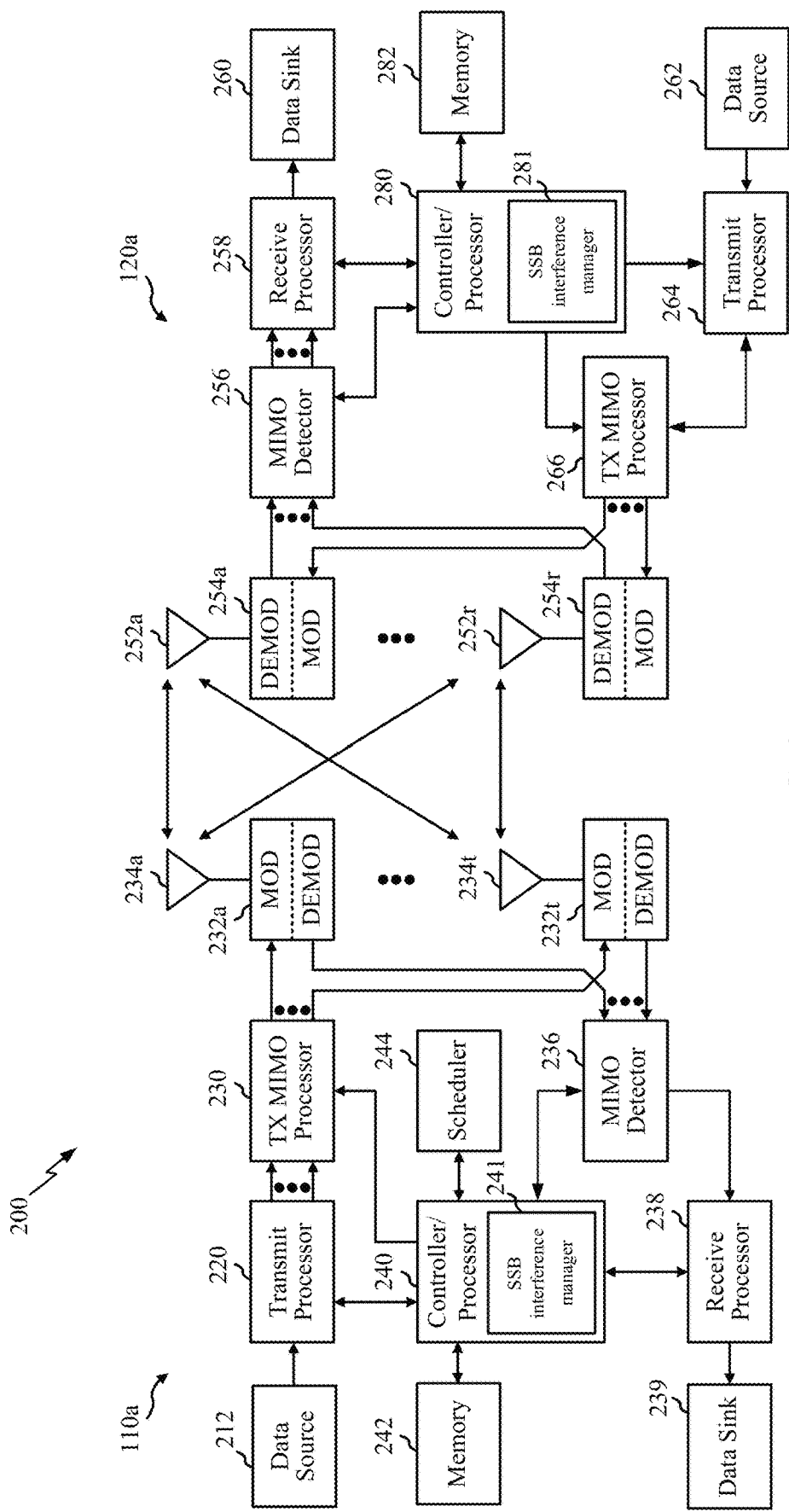
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC) control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the base station 110 or a parent IAB-node.

At the BS 110a or a parent IAB-node, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an SSB interference manager 241 that communicates with nodes of the IAB network based on SSB-based interference measurements, according to aspects described herein. As shown in FIG. 2, the controller/processor 280 of the UE 120a has an SSB interference manager 281 that communicates with nodes of the IAB network based on SSB-based interference measurements, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data.

Figure 3:
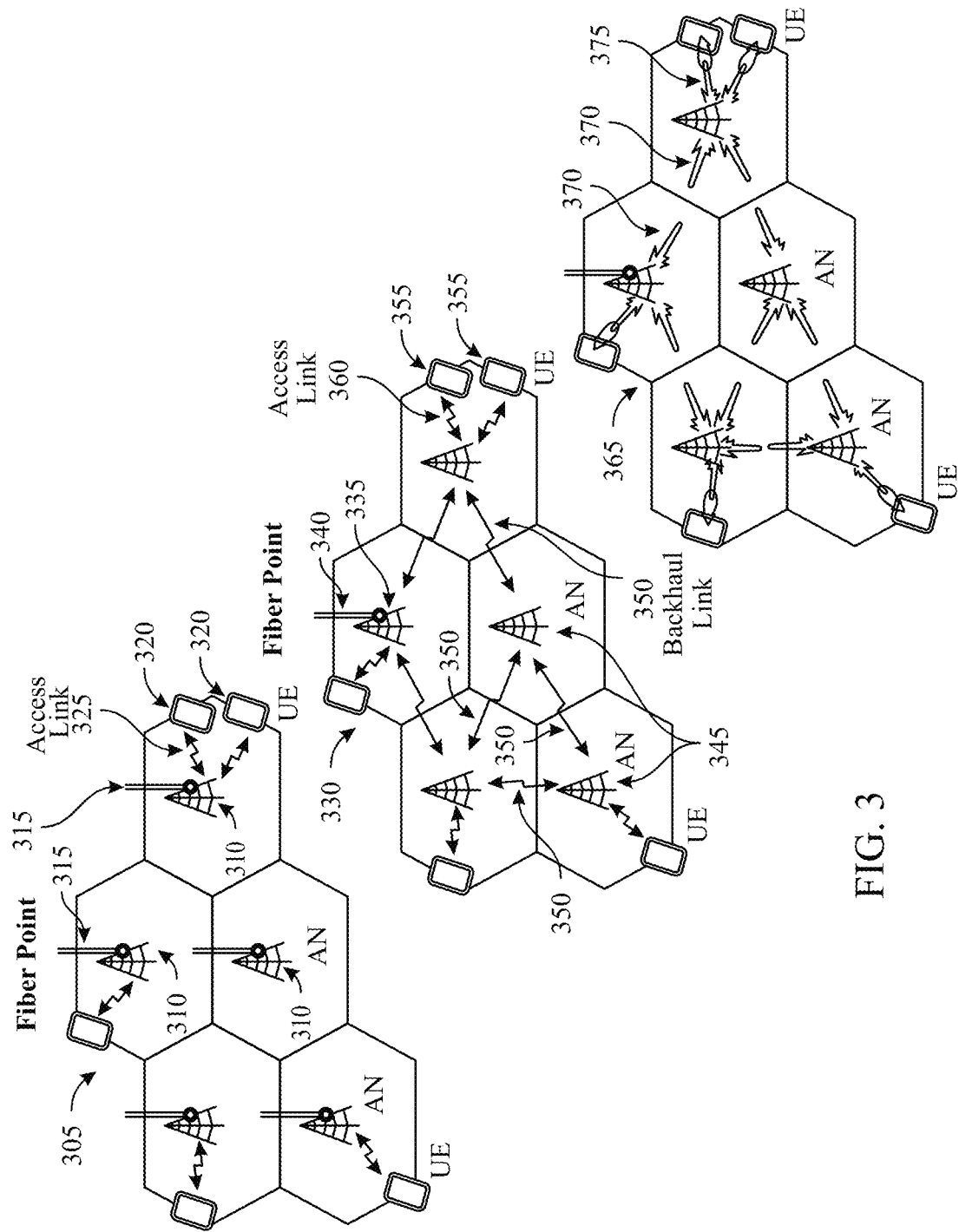
FIG. 3 is an example frame format for certain wireless communication systems (e.g., new radio (NR)), in accordance with certain aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations (BS) 310 (for example, access nodes (AN)), where each BS 310 communicates with a core network via a wired backhaul link 315, such as a fiber connection. ABS 310 may communicate with a UE 320 via an access link 325, which may be a wireless link. In some aspects, a BS 310 shown in FIG. 3 may correspond to a BS 110a shown in FIG. 1. Similarly, a UE 320 shown in FIG. 3 may correspond to a UE 120a shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple BSs, and sometimes the BS may be of differing types or have differing operational characteristics. For example, in some aspects, an IAB network may have at least one BS that is an anchor BS 335. The anchor BS may communicates with a core network via a wired backhaul link 340, such as a fiber connection. An anchor BS 335 may also be referred to as an IAB donor. Anchor BSs may be configured to communicate with other types of base stations or other communication devices (e.g. in a radio network or IAB network).

The IAB network may also include one or more non-anchor BSs 345. Non-anchor BSs may be referred to as relay BSs or IAB nodes. The non-anchor BS 345 may communicate directly with or indirectly with (for example, via one or more other non-anchor base stations 345) the anchor BS 335 via one or more backhaul links 350 to form a backhaul path to the core network for carrying backhaul traffic. Backhaul link 350 may be a wireless link. Anchor BSs 335 or non-anchor BSs 345 may communicate with one or more UEs 355 via access links 360, which may be wireless links for carrying access traffic. In some aspects, an anchor BS 335 or a non-anchor BS 345 shown in FIG. 3 may correspond to a BS 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between BSs may use millimeter waves to carry information or may be directed toward a target BS using beamforming, precoding. Similarly, the wireless access links 375 between a UE and a BS may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (e.g., 5G NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with BS 110 for that IAB node, and an MT of an IAB node may perform functions described in connection with UE 120 for that IAB node.

Figure 4:
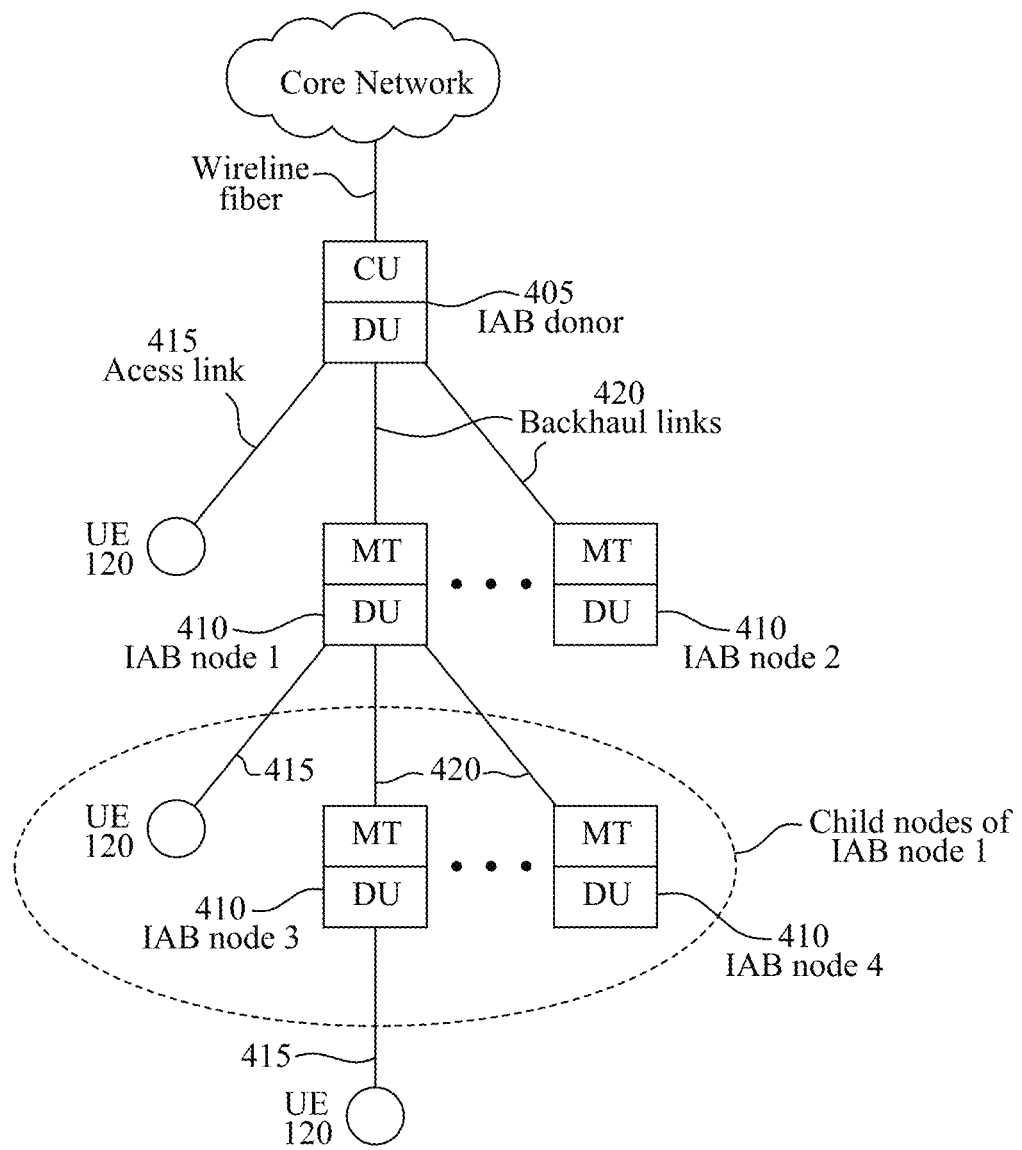
FIG. 4 is a diagram illustrating an example of an integrated access and backhaul (IAB) network architecture in accordance with certain aspects of the present disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a BS 110, such as an anchor BS, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (e.g., a radio resource control (RRC) configuration message, an F1 application protocol (FLAP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example, in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (i.e., non-moving). Next generation (5G) wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., 5G NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement physical (PHY), medium access control (MAC), and/or radio link control (RLC) layers.

Figure 5:
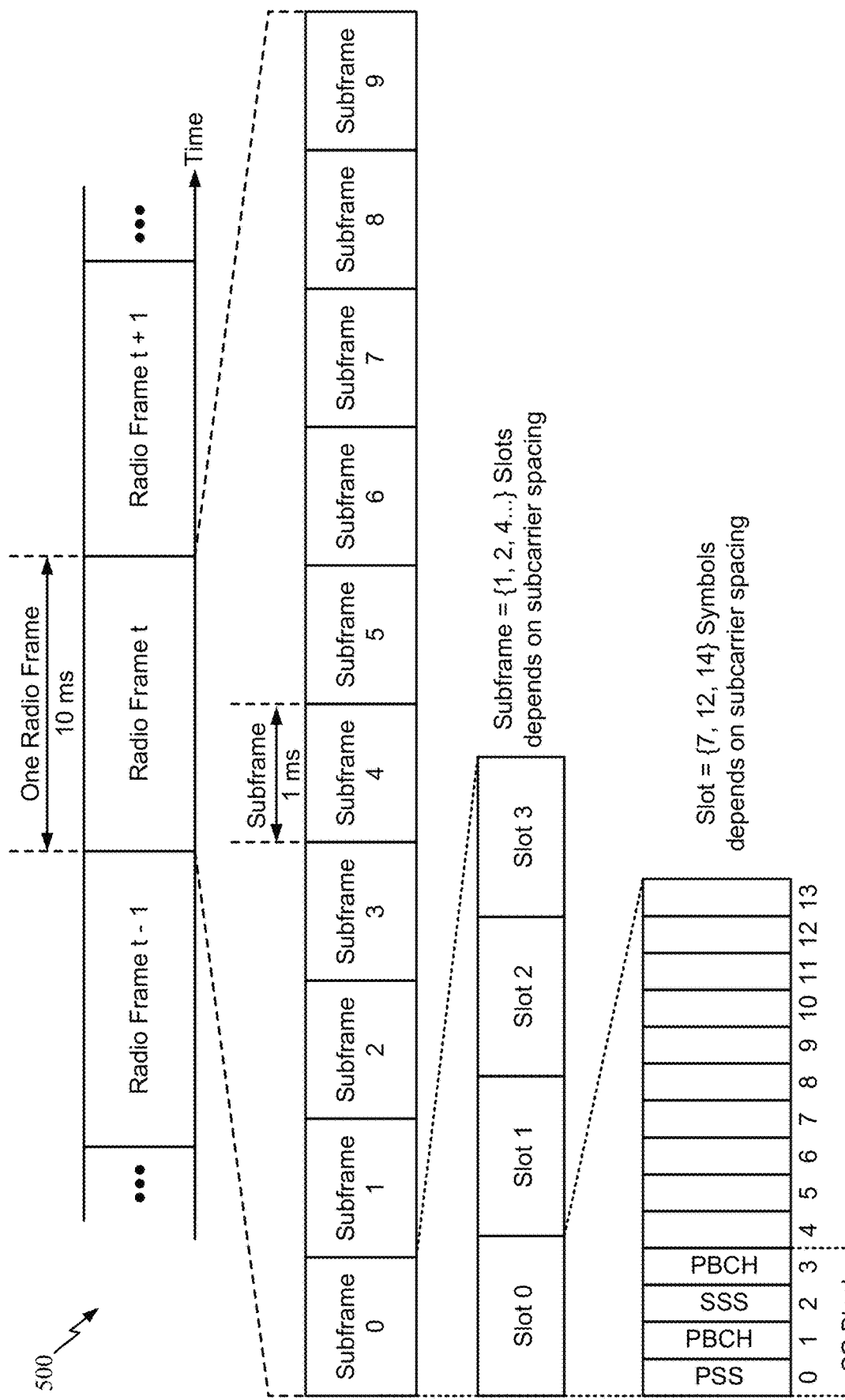
FIG. 5 is an example frame format for certain wireless communication systems (e.g., NR), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Synchronization Signal Block-Based Interference Measurement in IAB

Aspects of the present disclosure provide techniques for interference measurements based on synchronization signal blocks (SSBs) in a wireless network, such as an Integrated Access and Backhaul (IAB) network.

Generally, an IAB network adopts and uses interference mitigation techniques defined for other radio access networks. However, if the two neighboring cells that are interfering each other, via either inter-carrier interference (ICI) or cross-link interference (CLI), are an IAB node and its parent-node, this relationship between the cells allows for more efficient local handling of interference, in terms of interference measurement, reporting, and/or coordination.

FIGS. 6A-6D illustrate different example scenarios of interference between IAB nodes (denoted as C) and their parent nodes (denoted as P). In the figures, the larger circles in the parent node P and child node C represent distributed units (DUs) while the smaller circles represent mobile termination components (MTs).

In some scenarios, there may be interference when one node is transmitting and the other is receiving. For example, in FIG. 6A, while the child node C is receiving from child node n2, child node C may experience interference (represented by dotted lines) when parent node P is transmitting to another child n1. Similarly, when the parent node P is receiving from child node n1, parent node P may experience interference when child node C is transmitting to child node n2. The inference in FIG. 6A can be CLI and can occur during dynamic time division duplexing (TDD).

Figure 6A:
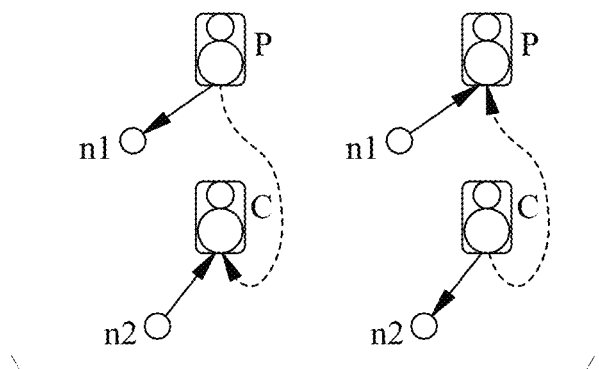
FIGS. 6A-6D illustrate example interference scenarios in accordance with certain aspects of the present disclosure.
Figure 6B:
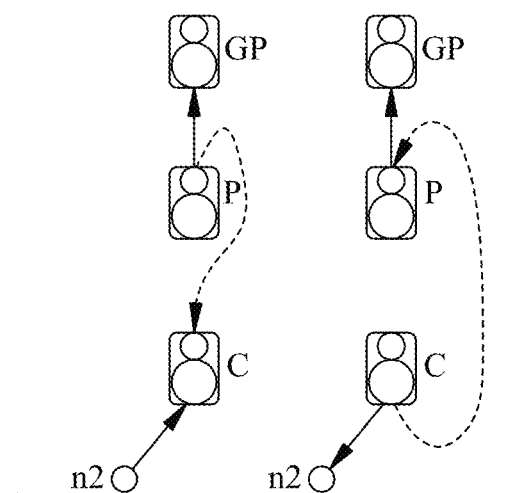
Figure 6C:
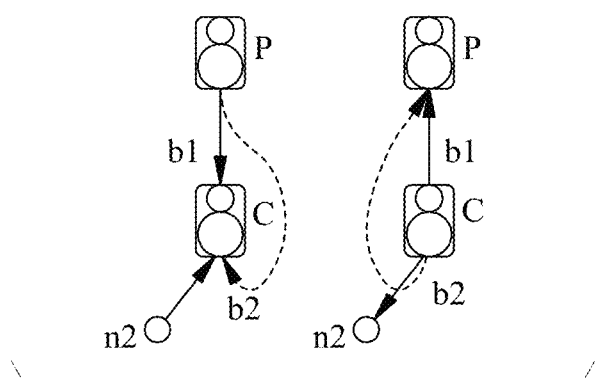
Figure 6D:
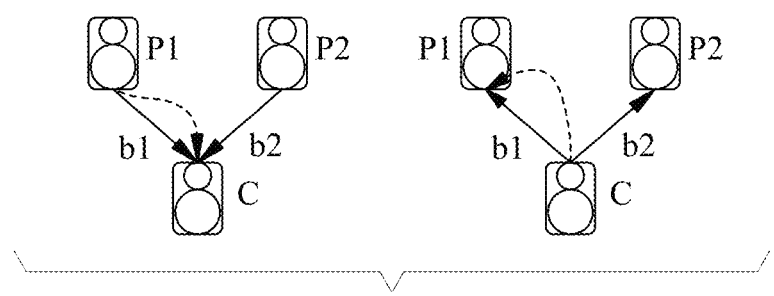

Interference can also occur during static TDD. In FIG. 6B, transmissions from parent node P to a grandparent node GP can cause interference while child node C is receiving from another node n2. Similarly, transmissions from child node C to node n2 can cause interference when the parent node P is receiving from the grandparent node GP.

In some cases, there may be interference when one node is transmitting to two different nodes. For example, in FIG. 6C, transmissions from parent node P to child node C's MT may interfere with child node C's reception of transmissions from child node n2 on child node C's DU. Similarly, transmissions from child node C's DU may interfere with reception on parent node P's MT. These interference scenarios can occur during space division multiplexing (SDM) across adjacent hops.

Some scenarios involve inference when transmitting to or receiving from multiple parent nodes. For example, in FIG. 6D, child node C can receive and or transmit to parent nodes P1 or P2. When receiving, transmissions from one parent node may interfere with child node C's reception of transmissions from the other parent node. When transmitting, transmissions from child node C to one of the parent nodes can cause interference to the transmissions to the other parent node. These interference scenarios can occur for co-channel dual connectivity (DC) with SDM.

In some scenarios, an IAB node may measure interference based on uplink. For example, the network can configure sounding reference signal (SRS) resource sets so an IAB node can do uplink interference measurements. The configuration may include information regarding transmit beams, such as spatial relationship information (e.g., SpatialRelationInfo, Quasi Co Location (QCL) with SSB, Channel State Information Reference Signal (CSI-RS), and/or SRS). In some cases, such information may not be configured and a UE may be assumed to perform an uplink beam sweep. With UL-based measurements, there may not be any reporting.

Generally, a parent node (P) may have a number of beam candidates (N_P), and some of the parent beam candidates may be associated with the parent node's MT (on the backhaul (BH) link to a grandparent node). Similarly, a child node (C) may have a number of beam candidates (N_C) associated with the child node's DU and MT (also in case of multiple parent nodes).

To address the interference, the parent and child nodes may learn an interference matrix for any pair of nodes of the IAB network. The interference matrix may indicate reference signal receive power (RSRP) or received signal strength indicator (RSSI). The matrix may have a size of N_P×N_C, where each entry may be associated with a corresponding beam pair.

Aspects of the present disclosure provide techniques for interference measurements based on periodic SSBs. While the techniques presented herein are described with reference to IAB networks and corresponding nodes, the techniques may be more generally applied to any type of wireless node (e.g., generally to UEs and base stations).

Figure 7:
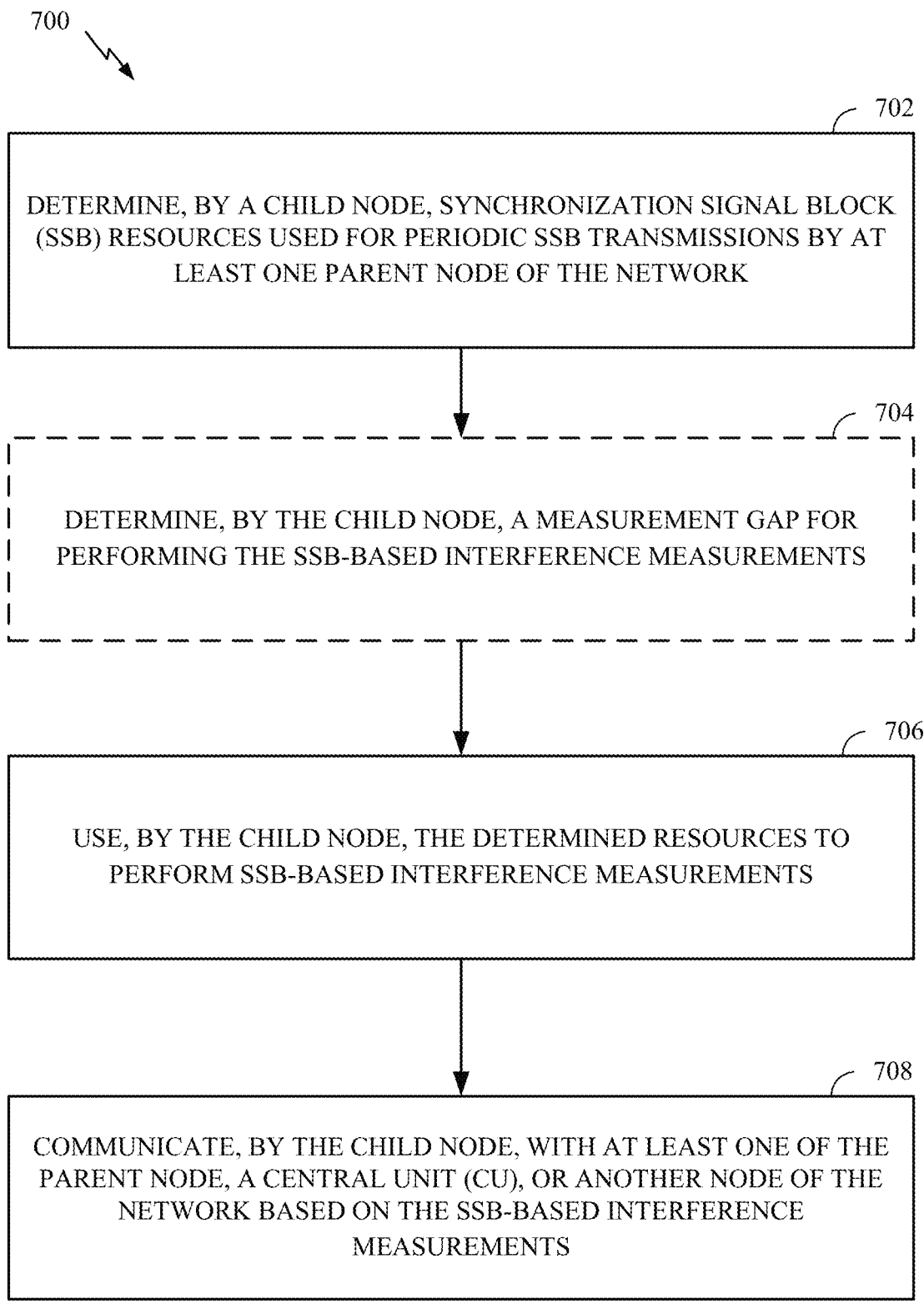
FIG. 7 is a flow diagram illustrating example operations for wireless communication by a child node of a network, in accordance with certain aspects of the present disclosure.

FIG. 7 is a flow diagram illustrating example operations 700 for wireless communication by a child node (e.g., of an IAB network), in accordance with certain aspects of the present disclosure. Operations 700 may be implemented as software components that are executed and run on one or more processors (e.g., controller/processor 240 of FIG. 2). Further, the transmission and reception of signals by the first wireless communication device in operations 700 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 700 may begin, at 702, by determining SSB resources used for periodic SSB transmissions by at least one parent node of the network.

In some aspects, at 704, the child node determines a measurement gap for performing the SSB-based interference measurements.

At 706, the child node uses the determined resources to perform SSB-based interference measurements.

At 708, the child node communicates with at least one of the parent node, a central unit (CU), or another node of the network based on the SSB-based interference measurements.

Figure 8:
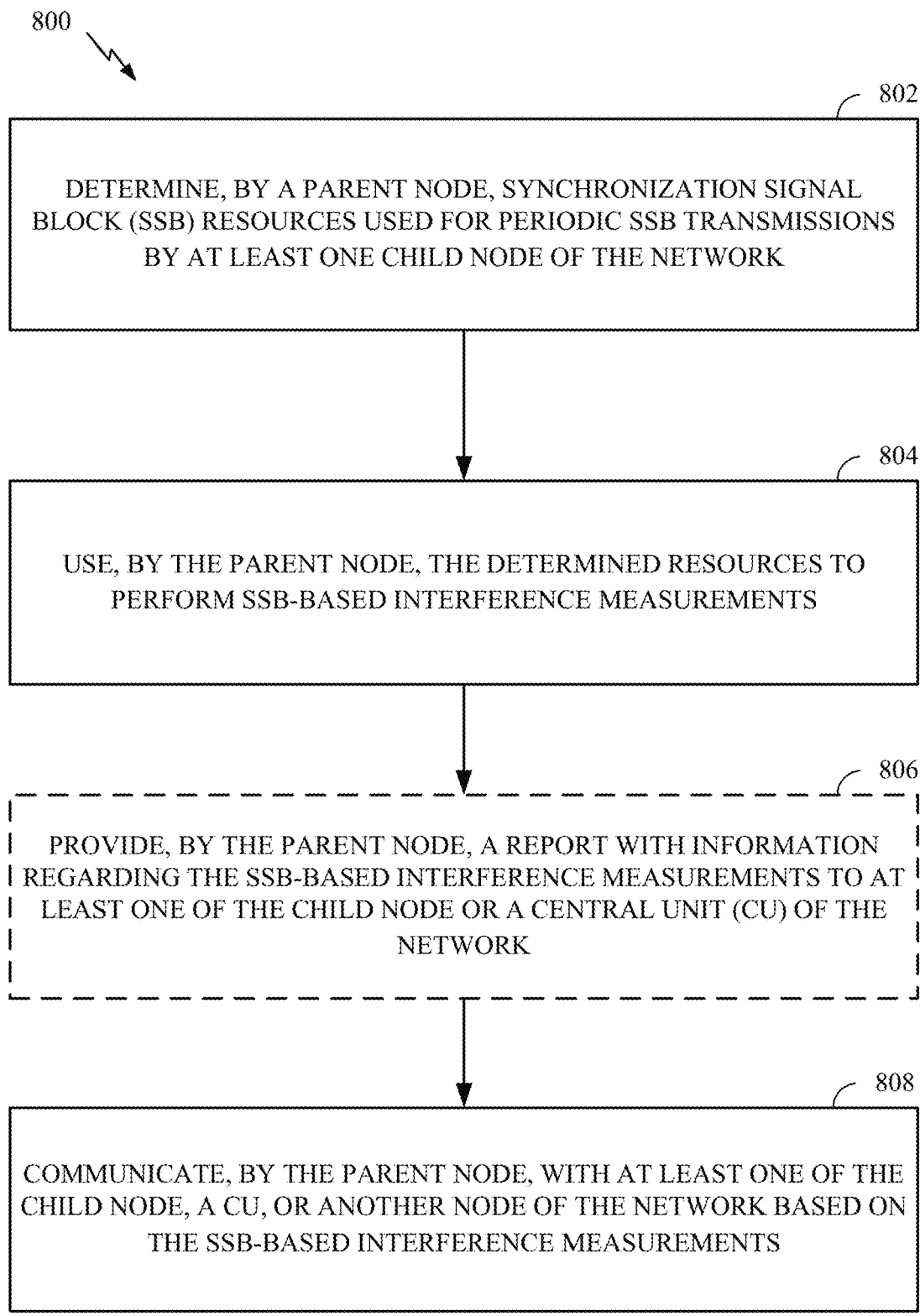
FIG. 8 is a flow diagram illustrating example operations for wireless communication by a parent node of a network, in accordance with certain aspects of the present disclosure.

FIG. 8 is a flow diagram illustrating example operations 800 for wireless communication by a parent node (e.g., of an IAB network), in accordance with certain aspects of the present disclosure. Operations 800 may be implemented as software components that are executed and run on one or more processors (e.g., controller/processor 280 of FIG. 2). Further, the transmission and reception of signals by the first wireless communication device in operations 800 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 800 begin, at 802, by determining SSB resources used for periodic SSB transmissions by at least one child node of the network.

At 804, the parent node uses the determined resources to perform SSB-based interference measurements.

In some aspects, at 806, the parent node provides a report with information the SSB-based interference measurements to at least one of the child node or a CU of the network.

At 808, the parent node communicates with at least one of the child node, a CU, or another node of the network based on the SSB-based interference measurements.

Figure 9:
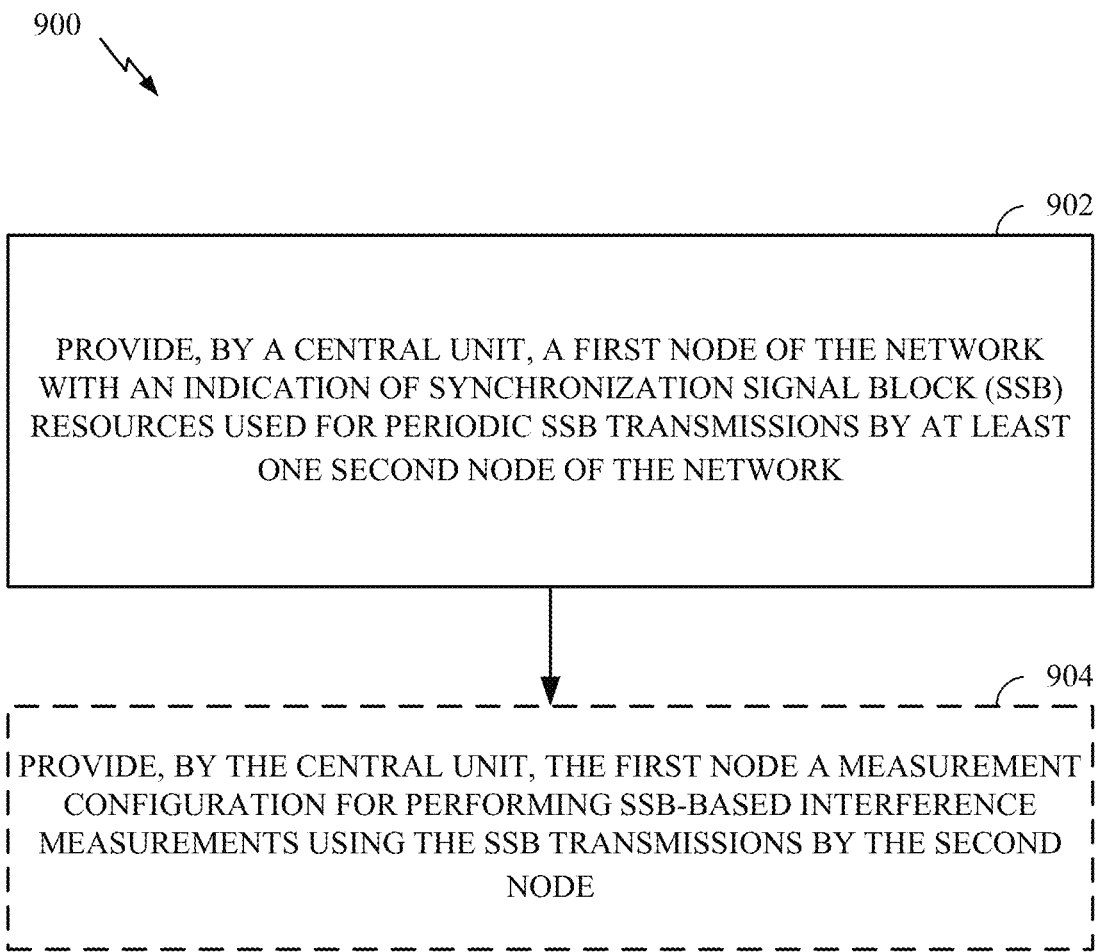
FIG. 9 is a flow diagram illustrating example operations for wireless communication by a central unit of a network, in accordance with certain aspects of the present disclosure.

FIG. 9 is a flow diagram illustrating example operations 900 for wireless communication by a central unit (e.g., of an IAB network), in accordance with certain aspects of the present disclosure. Operations 900 may be implemented as software components that are executed and run on one or more processors (e.g., controller/processor 280 of FIG. 2). Further, the transmission and reception of signals by the first wireless communication device in operations 900 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 900 begin, at 902, by providing a first node of the network with an indication of SSB resources used for periodic SSB transmissions by at least one second node of the network. The first node may be either the child node or the parent node, and respectively, the second node may be either the parent node or the child node.

In some aspects, at 904, the central unit provides the first node a measurement configuration for performing SSB-based interference measurements using the SSB transmissions by the second node.

In some aspects, the parent node's (P) DU(s) may send periodic SSBs. Some periodic SSBs may be cell-defining SSBs (CD-SSBs). CD-SSBs may be used to provide initial access to MTs. Some periodic SSBs may be SSBs used for mobility and radio resource managements (RRM-SSBs). RRM-SSBs may be used by MTs to perform measurements and/or reporting needed for hand-over. In some cases, RRM-SSBs may also be used for inter-relay discovery.

According to aspects of the present disclosure, a child node (C) may use these periodic SSBs for interference measurement (IM) (e.g., to measure various combination of transmit beams (i.e., SSBs) and receive beams). Accordingly, the child node may learn the NP×N_C interference matrix with received signal strength indicator (RSSI) information.

In some cases, other cells, sectors, and/or distributed unit (DUs) may be collocated with the serving cell at the parent node. The child node may know the identity and/or configurations of these other nodes, and may be provided with the physical cell ID (PCI) of other cell or sectors at the parent node. Additionally, the child node may be provided with resources and configurations used by these other nodes to send their periodic SSBs. For example, for CD-SSBs, the child node may be provided information about time location of the burst set (the associated half-frame), synchronization signal (SS) raster, periodicity, the transmitter of the SSBs, and/or transmit power. For RRM-SSBs, the child node may be provided with an SSB measurement timing configuration (SMTC), including information about transmit power.

The child node may need a measurement gap to perform SSB-based interference measurement (even only for its own parent's DU). The measurement gap may be a time window within which child node's MT is not scheduled by the parent node's DU. In some cases, the child node may request for the measurement gap from the CU to allocate resources and to semi-statically configure communications accordingly. In some cases, the child node may request for the measurement gap from the parent node's DU, which may be a L1 uplink control information (UCI) request or L2 medium access control (MAC) Control Element (MAC-CE) request. In some aspects, the network (CU) or parent node's DU may leave and indicate a measurement gap for the child node, either proactively or in response to a request from the child node.

In some aspects, the child node uses the determined periodic SSB resources for interference measurements. For example, the child node measures an SSB sent by a cell, using one or multiple receive beams wherein the receive beams are associated with the beam directions of child DU's other communications. The CU or parent node's DU may indicate to the child node which receive beam directions to use for measurements. In some cases, the child node may provide a report to the CU or parent-node about its measurements.

In some aspects, the child node's DU(s) may also send periodic SSBs over the air. The periodic SSBs may be CD-SSBs or RRM-SSBs. The parent node may use these periodic SSBs for interference measurement (e.g., measuring various combination of transmit beams (i.e. SSBs) and receive beams). Accordingly, the parent node may then learn the [N_P×N_C] interference matrix with received signal strength power (RSSP) information.

For the parent node to use the periodic SSBs for interference measurements, the parent node needs to know resources over which the child node sends its SSBs, and the parent node needs "idle" resources (e.g., a measurement gap) to do measurements without affecting ongoing communications.

For CD-SSBs, the parent node may have detected the child node's DU through running a cell-search procedure. The cell-search procedure may be implementation-specific. In some cases, the parent node is provided with the PCI's of the child node's DUs. In some cases, the parent node is provided with the child node's DU's resources and configurations (including transmit power) for CD-SSB transmission. If the measurement window lies within the parent node's DU resources, the parent node may have more flexibility by not scheduling any communication (still it may overlap with semi-static communications). If the window lies within resources where parent node's MT is active, the parent node may perform measurements when not scheduled by the grandparent. In some cases, the parent node may request for a gap window from the CU to allocate resources, and semi-statically configured communications accordingly. In some cases, the parent node may request for a gap window from its parent, and the request may be L1 (uplink control information (UCI)) or L2 (MAC-CE) request. The CU or parent of the parent node may leave and indicate a measurement gap for the parent node, which may be pro-active or in response to a request from the child node.

For RRM-SSB (e.g., SSBs configured for inter-relay discovery), the parent node's MT is provided with SMTC configuration. The parent node may be provided with the PCIs of the child node's DU. The CU may align the SMTC of the parent node's MT and SSB transmission configuration (STC) of the child node's DU cells for measurement opportunities. In some cases, the measurement gap may not be guaranteed, so the parent node may request for a gap window from the CU or from its parent.

In some aspects, the parent node uses the determined SSB resources for interference measurements from its child node. For example, the parent node measures an SSB using one or multiple receive beams wherein the receive beams are associated with the beam directions of the parent node's DU's other communications. The CU may indicate which receive beam directions to use for measurements. In some cases, the parent node's DU may provide a report to CU or child node about its measurements.

Figure 10:
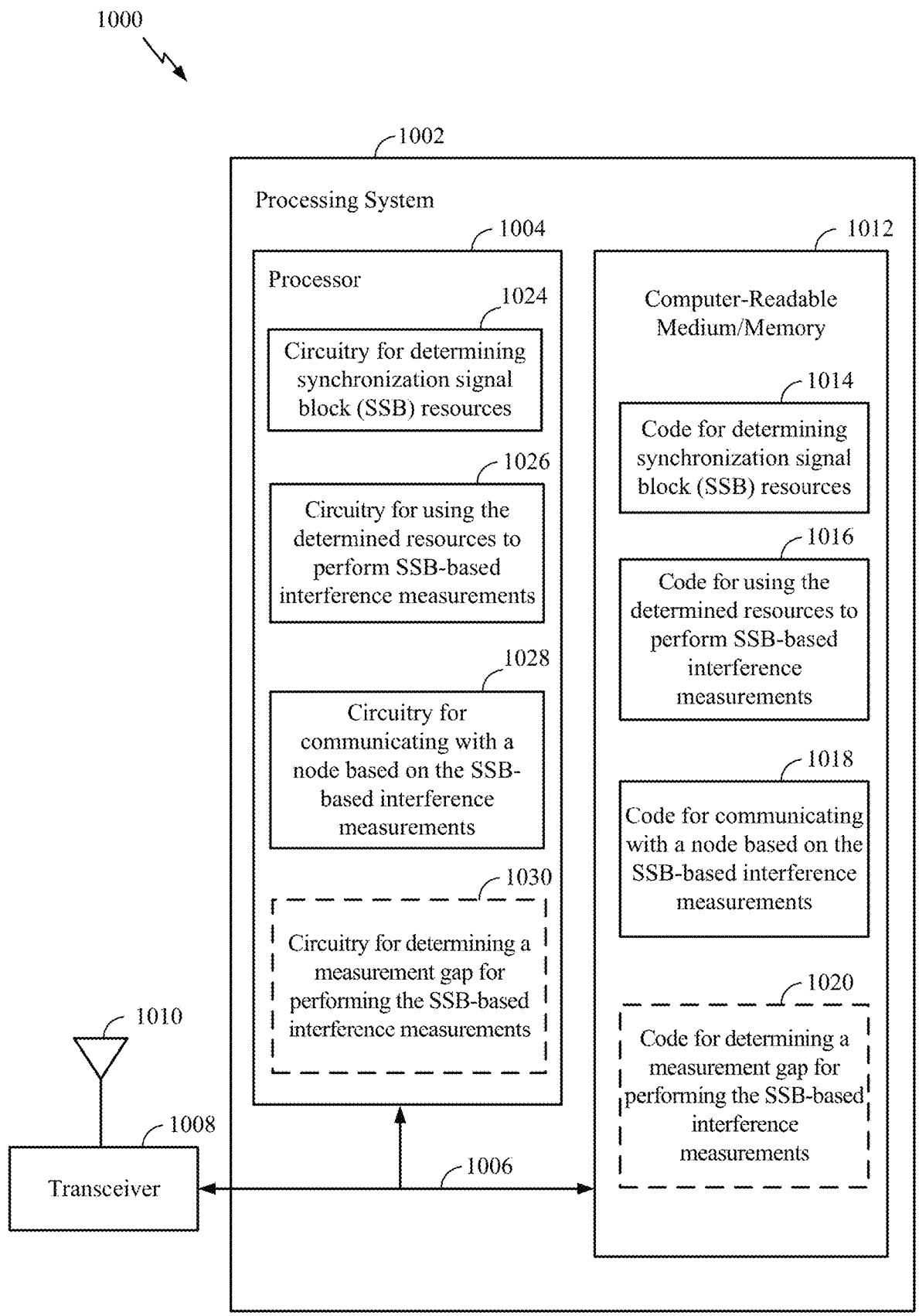
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for interference measurements based on SSBs in a wireless network, such as an IAB network. In certain aspects, computer-readable medium/memory 1012 stores code 1014 for determining SSB resources used for periodic SSB transmissions by at least one parent node of the network; code 1016 for using the determined resources to perform SSB-based interference measurements; and code 1018 for communicating with at least one of the parent node, a CU, or another node of the network based on the SSB-based interference measurements. In certain aspects, computer-readable medium/memory 1012 may stores code 1020 for determining a measurement gap for performing the SSB-based interference measurements. In certain aspects, the processor 1004 has circuitry configured to implement the code stored in the computer-readable medium/memory 1012. The processor 1004 includes circuitry 1024 for determining SSB resources used for periodic SSB transmissions by at least one parent node of the network; circuitry 1026 for using the determined resources to perform SSB-based interference measurements; and circuitry 1028 for communicating with at least one of the parent node, a central unit (CU), or another node of the network based on the SSB-based interference measurements. In certain aspects, processor 1004 may include circuitry 1030 for determining a measurement gap for performing the SSB-based interference measurements.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1028 of the communication device 1000 in FIG. 10. Means for receiving (or means for obtaining) may include a receiver and/or an antenna(s) 234 of the BS 110a or a receiver and/or antenna(s) 252 of the UE 120a illustrated in FIG. 2 and/or circuitry 1028 of the communication device 1000 in FIG. 10. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1002 of the communication device 1000 in FIG. 10.

Figure 11:
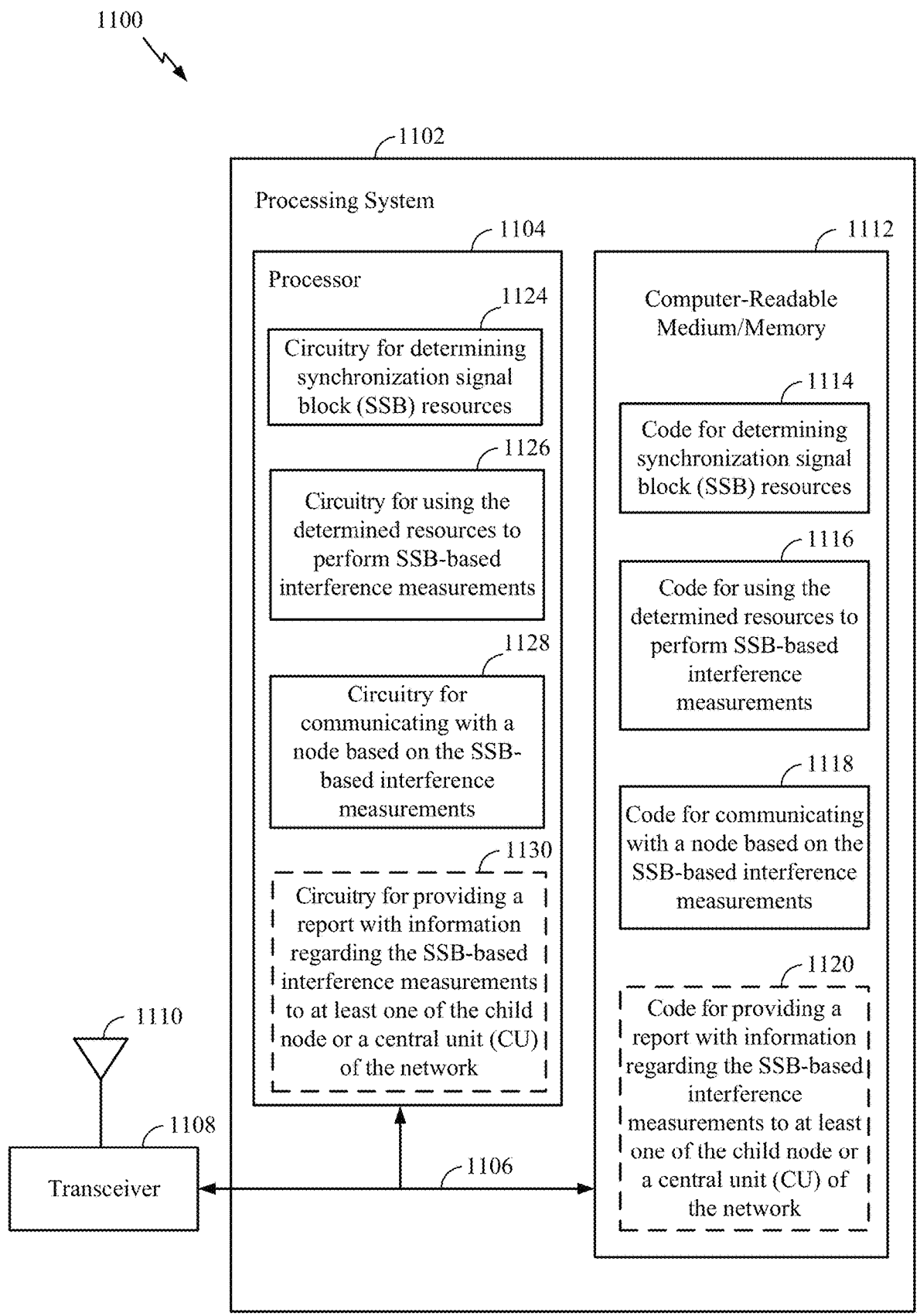
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for interference measurements based on SSBs in a wireless network, such as an IAB network. In certain aspects, computer-readable medium/memory 1112 stores code 1114 for determining SSB resources used for periodic SSB transmissions by at least one child node of the network; code 1116 for using the determined resources to perform SSB-based interference measurements; and code 1118 for communicating with at least one of the child node, a CU, or another node of the network based on the SSB-based interference measurements. In certain aspects, computer-readable medium/memory 1112 may stores code 1120 for receiving signaling indicating the different receive beams from the CU. In certain aspects, the processor 1104 has circuitry configured to implement the code stored in the computer-readable medium/memory 1112. The processor 1104 includes circuitry 1124 for determining SSB resources used for periodic SSB transmissions by at least one child node of the network; circuitry 1126 for using the determined resources to perform SSB-based interference measurements; and circuitry 1128 for communicating with at least one of the child node, a CU, or another node of the network based on the SSB-based interference measurements. In certain aspects, processor 1104 may include circuitry 1130 for providing a report with information regarding the SSB-based interference measurements to at least one of the child node or a CU of the network.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2 and/or circuitry 1128 of the communication device 1100 in FIG. 11. Means for receiving (or means for obtaining) may include a receiver and/or an antenna(s) 234 of the BS 110*a* or a receiver and/or antenna(s) 252 of the UE 120*a* illustrated in FIG. 2 and/or circuitry 1128 of the communication device 1100 in FIG. 11. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1102 of the communication device 1100 in FIG. 11.

Figure 12:
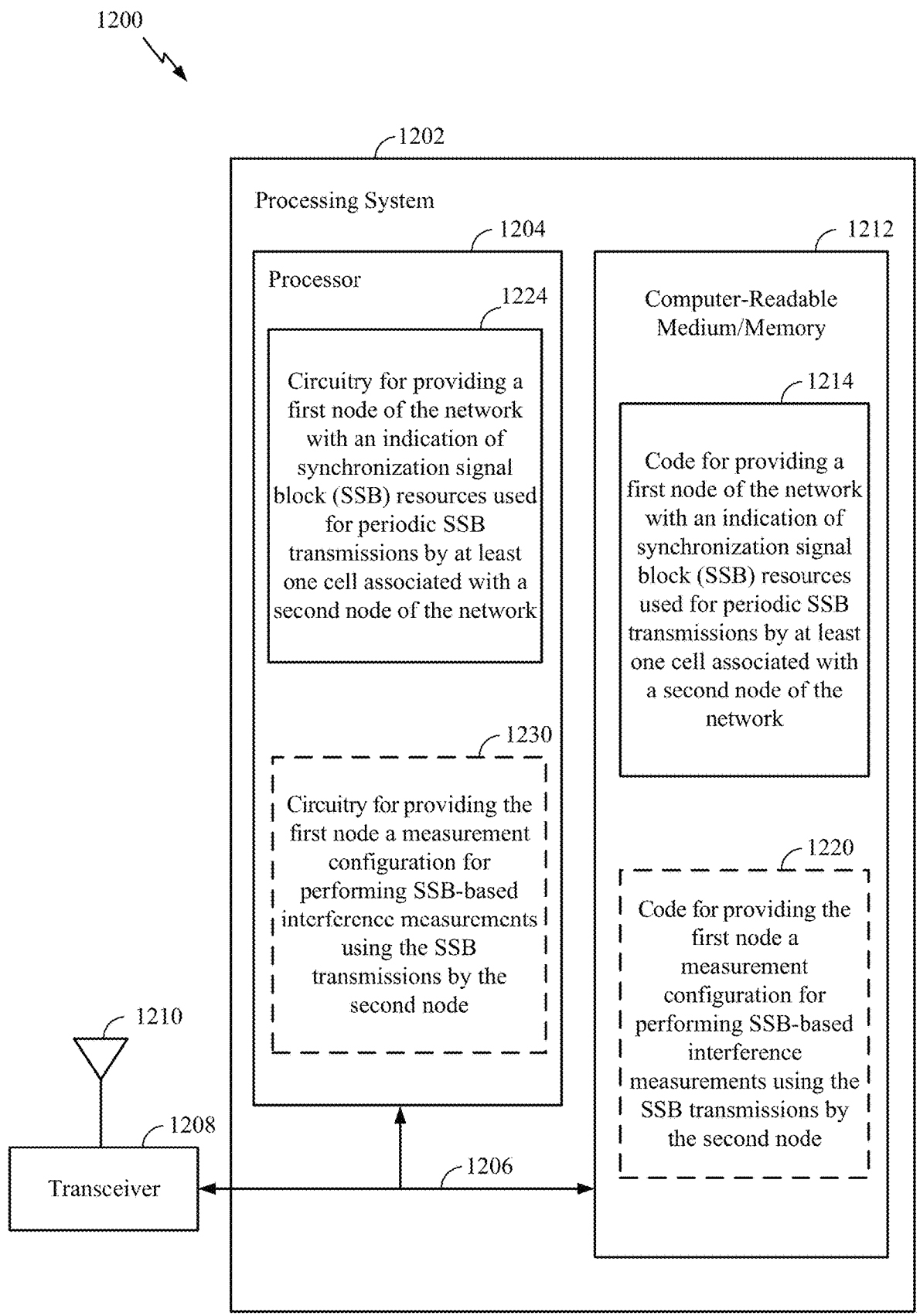
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein for interference measurements based on SSBs in a wireless network, such as an IAB network. In certain aspects, computer-readable medium/memory 1212 stores code 1214 for providing a first node of the network with an indication of SSB resources used for periodic SSB transmissions by at least one cell associated with a second node of the network. In certain aspects, computer-readable medium/memory 1212 may store code 1120 for providing a report with information regarding the SSB-based interference measurements to at least one of the child node or a CU of the network. In certain aspects, the processor 1204 has circuitry configured to implement the code stored in the computer-readable medium/memory 1212. The processor 1204 includes circuitry 1214 for providing a first node of the network with an indication of SSB resources used for periodic SSB transmissions by at least one cell associated with a second node of the network. In certain aspects, processor 1204 may include circuitry 1230 for providing the first node a measurement configuration for performing SSB-based interference measurements using the SSB transmissions by the second node.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2. Means for receiving (or means for obtaining) may include a receiver and/or an antenna(s) 234 of the BS 110*a* or a receiver and/or antenna(s) 252 of the UE 120*a* illustrated in FIG. 2. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1202 of the communication device 1200 in FIG. 12.

Example Aspects

In a first aspect, a method for wireless communications by a child node of a network, includes: determining synchronization signal block (SSB) resources used for periodic SSB transmissions by at least one parent node of the network; using the determined resources to perform SSB-based interference measurements; and communicating with at least one of the parent node, a central unit (CU), or another node of the network based on the SSB-based interference measurements.

In a second aspect, in combination with the first aspect, the child node, parent node, and CU are part of an integrated access and backhaul (IAB) network.

In a third aspect, in combination with any of the first and second aspects, the method further includes at least one of: providing a report with information regarding the SSB-based interference measurements to at least one of the parent node or the CU; and receiving signaling indicating different receive beams from at least one of the parent node or CU.

In a fourth aspect, in combination with any of the first through third aspects, the method further includes determining resources for one or more other nodes collocated with the parent node; and using the determined SSB resources for the other nodes when performing the SSB-based interference measurements.

In a fifth aspect, in combination with the fourth aspect, the method further includes receiving a physical cell identifier (PCI) of other cells or sectors at the parent node; and determining the resources for the one or more other nodes collocated with the parent node, based on the PCIs.

In a sixth aspect, in combination with the fifth aspect, the child node is further provided with configuration information about resources used by the other nodes to transmit periodic SSBs.

In a seventh aspect, in combination with the sixth aspect, the configuration information for each node indicates at least one of: time location of a burst set, a synchronization signal (SS) raster, a periodicity, which SSBs are transmitted in a burst, or transmit power.

In an eighth aspect, in combination with one or more of the first through seventh aspects, the method further includes determining a measurement gap for performing the SSB-based interference measurements, wherein the measurement gap corresponds to a time window during which a mobile terminal (MT) function of the child node is not scheduled by a distributed unit (DU) of the parent node.

In a ninth aspect, in combination with the eighth aspect, the method further includes receiving an indication of the measurement gap from at least one of the parent node or CU.

In a tenth aspect, in combination with the ninth aspect, the method further includes sending a request for the measurement gap, wherein the indication is received from the parent node or CU in response to the request.

In an eleventh aspect, a method for wireless communications by a parent node of a network, includes: determining synchronization signal block (SSB) resources used for periodic SSB transmissions by at least one child node of the network; using the determined resources to perform SSB-based interference measurements; and communicating with at least one of the child node, a central unit (CU), or another node of the network based on the SSB-based interference measurements.

In a twelfth aspect, in combination with the eleventh aspect, the child node, parent node, and CU are part of an integrated access and backhaul (IAB) network.

In a thirteenth aspect, in combination with one or more of the eleventh and twelfth aspects, the method further includes providing a report with information regarding the SSB-based interference measurements to at least one of the child node or the CU of the network.

In a fourteenth aspect, in combination with one or more of the eleventh through thirteenth aspects, the interference measurements are performed using different receive beams, wherein the receive beams are associated with beam directions of a distributed unit (DU) of the parent node.

In a fifteenth aspect, in combination with the fourteenth aspect, the method further includes receiving signaling indicating the different receive beams from the CU.

In a sixteenth aspect, in combination with one or more of the eleventh through fifteenth aspects, the method further includes detecting the SSB transmissions from the child node based on a cell search procedure.

In a seventeenth aspect, in combination with one or more of the eleventh through sixteenth aspects, the parent node is provided with a physical cell identifier (PCI) of one or more distributed units (DUs) of the child node; and the parent node determines the resources for one or more other DUs, based on the PCIs.

In an eighteenth aspect, in combination with the seventeenth aspect, the parent node is further provided with configuration information about resources used by the DUs to transmit periodic SSBs.

In a nineteenth aspect, in combination with the eighteenth aspect, the configuration information for each node indicates at least one of: time location of a burst set, a synchronization signal (SS) raster, a periodicity, which SSBs are transmitted in a burst, or transmit power.

In a twentieth aspect, in combination with the nineteenth aspect, the method further includes receiving an indication of a measurement gap from at least one of a grandparent node or the CU.

In a twenty-first aspect, in combination with one or more of the eleventh through twentieth aspects, the method further includes determining a measurement gap for performing the SSB-based interference measurements.

In a twenty-second aspect, in combination with the twenty-first aspect, the measurement gap corresponds to a time window during which a mobile terminal (MT) function of the parent node is not scheduled by a distributed unit (DU) of a grandparent node.

In a twenty-third aspect, in combination with the twenty-second aspect, the method further includes sending a request for the measurement gap, wherein an indication is received from the parent node or CU in response to the request.

In a twenty-fourth aspect, a method for wireless communications by a central unit (CU) of a network, includes: providing a first node of the network with an indication of synchronization signal block (SSB) resources used for periodic SSB transmissions by at least one cell associated with a second node of the network.

In a twenty-fifth aspect, in combination with the twenty-fourth aspect, the method further includes providing the first node a measurement configuration for performing SSB-based interference measurements using the SSB transmissions by the second node.

In a twenty-sixth aspect, in combination with one or more of the twenty-fourth through twenty-fifth aspects, the first node comprises a child node and the second node comprises a parent node; or the first node comprises a parent node and the second node comprises a child node; and wherein the child node, parent node, and CU are part of an integrated access and backhaul (IAB) network.

In a twenty-seventh aspect, in combination with one or more of the twenty-fifth through twenty-sixth aspects, the measurement configuration indicates at least one of: one or more receive beams to use for the SSB-based interference measurements; or resources to use for the SSB-based interference measurements.

In a twenty-eighth aspect, in combination with one or more of the twenty-fifth through twenty-seventh aspects, the method further includes at least one of: providing the first node with information indicating a measurement gap for performing the SSB-based interference measurements; providing the first node with a report configuration for providing a report with results of the SSB-based interference measurements; receiving a report from the first node with results of the SSB-based interference measurements; and configuring at least one of an SSB measurement timing configuration or SSB transmission configuration (STC) window to enable the first node to measure the SSBs transmitted by the second node.

In a twenty-ninth aspect, in combination with the twenty-eighth aspect, the method further includes at least one of: providing an indication of the reported results to the second node or another node of the network; and using the reported interference measurement results to at least one of configure or schedule resources for communications involving nodes in the network.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a child node of an integrated access and backhaul (IAB) network, comprising:
   determining synchronization signal block (SSB) resources used for periodic SSB transmissions by a parent node of the IAB network;
   receiving an indication of a measurement gap for performing SSB-based interference measurements from at least one of the parent node or central unit (CU) of the IAB network, wherein the measurement gap corresponds to a time window during which a mobile terminal (MT) function of the child node is not scheduled by a distributed unit (DU) of the parent node;
   using the determined SSB resources and the measurement gap to perform the SSB-based interference measurements; and
   communicating, using a backhaul link, with at least one of the parent node of the IAB network or the CU of the IAB network based on the SSB-based interference measurements.

2. The method of claim 1, further comprising at least one of:
   providing a report with information regarding the SSB-based interference measurements to at least one of the parent node or the CU; and
   receiving signaling indicating different receive beams from at least one of the parent node or CU.

3. The method of claim 1, further comprising:
   determining resources for one or more other nodes collocated with the parent node; and
   using the determined resources for the other nodes when performing the SSB-based interference measurements.

4. The method of claim 3, further comprising:
   receiving a physical cell identifier (PCI) of other cells or sectors at the parent node; and
   determining the resources for the one or more other nodes collocated with the parent node, based on the PCIs.

5. The method of claim 4, wherein:
   the child node is further provided with configuration information about resources used by the other nodes to transmit periodic SSBs.

6. The method of claim 5, wherein the configuration information for each node indicates at least one of: time location of a burst set, a synchronization signal (SS) raster, a periodicity, which SSBs are transmitted in a burst, or transmit power.

7. The method of claim 1, further comprising sending a request for the measurement gap, wherein the indication is received from the parent node or the CU in response to the request.

8. A method for wireless communications by a parent node of an integrated access and backhaul (IAB) network, comprising:
   determining synchronization signal block (SSB) resources used for periodic SSB transmissions by a child node of the IAB network;
   receiving an indication of a measurement gap for performing SSB-based interference measurements from at least one of a grandparent node or a central unit (CU) of the IAB network, wherein the measurement gap corresponds to a time window during which a mobile terminal (MT) function of the parent node is not scheduled by a distributed unit (DU) of a grandparent node;
   using the determined SSB resources and the measurement gap to perform the SSB-based interference measurements; and
   communicating, using a backhaul link, with at least one of the child node of the IAB network or the CU of the IAB network based on the SSB-based interference measurements.

9. The method of claim 8, further comprising:
   providing a report with information regarding the SSB-based interference measurements to at least one of the child node or the CU of the network.

10. The method of claim 8, wherein:
    the interference measurements are performed using different receive beams, wherein the receive beams are associated with beam directions of a distributed unit (DU) of the parent node.

11. The method of claim 10, further comprising receiving signaling indicating the different receive beams from the CU.

12. The method of claim 8, further comprising detecting the SSB transmissions from the child node based on a cell search procedure.

13. The method of claim 8, wherein:
the parent node is provided with a physical cell identifier (PCI) of one or more distributed units (DUs) of the child node; and
the parent node determines the resources for one or more other DUs, based on the PCIs.

14. The method of claim 13, wherein:
the parent node is further provided with configuration information about resources used by the DUs to transmit periodic SSBs.

15. The method of claim 14, wherein the configuration information for each node indicates at least one of: time location of a burst set, a synchronization signal (SS) raster, a periodicity, which SSBs are transmitted in a burst, or transmit power.

16. The method of claim 8, further comprising sending a request for the measurement gap, wherein an indication is received from the parent node or CU in response to the request.

17. A method for wireless communications by a central unit (CU) of an integrated access and backhaul (IAB) network, comprising:
providing, using a backhaul link, a first node of the IAB network with an indication of synchronization signal block (SSB) resources used for periodic SSB transmissions by at least one cell associated with a second node of the IAB network; and
providing, to the first node, an indication of a measurement gap for performing SSB-based interference measurements, wherein:
the first node comprises a child node of the IAB network and the second node comprises a parent node of the IAB network, and the measurement gap corresponds to a time window during which a mobile terminal (MT) function of the child node is not scheduled by a distributed unit (DU) of the parent node, or
the first node comprises a parent node of the IAB network and the second node comprises a child node of the IAB network, and the measurement gap corresponds to a time window during which a mobile terminal (MT) function of the parent node is not scheduled by a distributed unit (DU) of a grandparent node.

18. The method of claim 17, further comprising:
providing the first node a measurement configuration for performing the SSB-based interference measurements using the SSB transmissions by the second node.

19. The method of claim 18, wherein the measurement configuration indicates at least one of:
one or more receive beams to use for the SSB-based interference measurements; or
resources to use for the SSB-based interference measurements.

20. The method of claim 18, further comprising at least one of:
providing the first node with a report configuration for providing a report with results of the SSB-based interference measurements;
receiving a report from the first node with results of the SSB-based interference measurements; or
configuring at least one of an SSB measurement timing configuration or SSB transmission configuration (STC) window to enable the first node to measure the SSBs transmitted by the second node.

21. The method of claim 20, further comprising at least one of:
providing an indication of the report with the results to the second node or another node of the network; and
using the report with the results to at least one of configure or schedule resources for communications involving nodes in the network.

22. An apparatus for wireless communications by a child node of an integrated access and backhaul (IAB) network, comprising:
one or more processors individually or collectively configured to execute instructions stored on one or more memories and to cause the child node to:
determine synchronization signal block (SSB) resources used for periodic SSB transmissions by a parent node of the IAB network;
receive an indication of a measurement gap for performing SSB-based interference measurements from at least one of the parent node or a central unit (CU) of the TAB network, wherein the measurement gap corresponds to a time window during which a mobile terminal (MT) function of the child node is not scheduled by a distributed unit (DU) of the parent node;
use the determined SSB resources and the measurement gap to perform the SSB-based interference measurements; and
communicate, using a backhaul link, with at least one of the parent node of the IAB network or the CU of the IAB network based on the SSB-based interference measurements.

23. The method of claim 1, wherein:
the MT function is configured for the communication with the at least one of the parent node or the CU; and
the child node includes a DU for communicating with one or more user equipments (UEs).

24. The method of claim 8, wherein at least one of:
the MT function is configured for the communication with the CU; or
the parent node further includes a DU configured for the communication with the child node.

* * * * *